Jan. 17, 1933.  G. MANIKOWSKE ET AL  1,894,357
WIND ELECTRIC PLANT
Original Filed Oct. 21, 1925  2 Sheets-Sheet 2
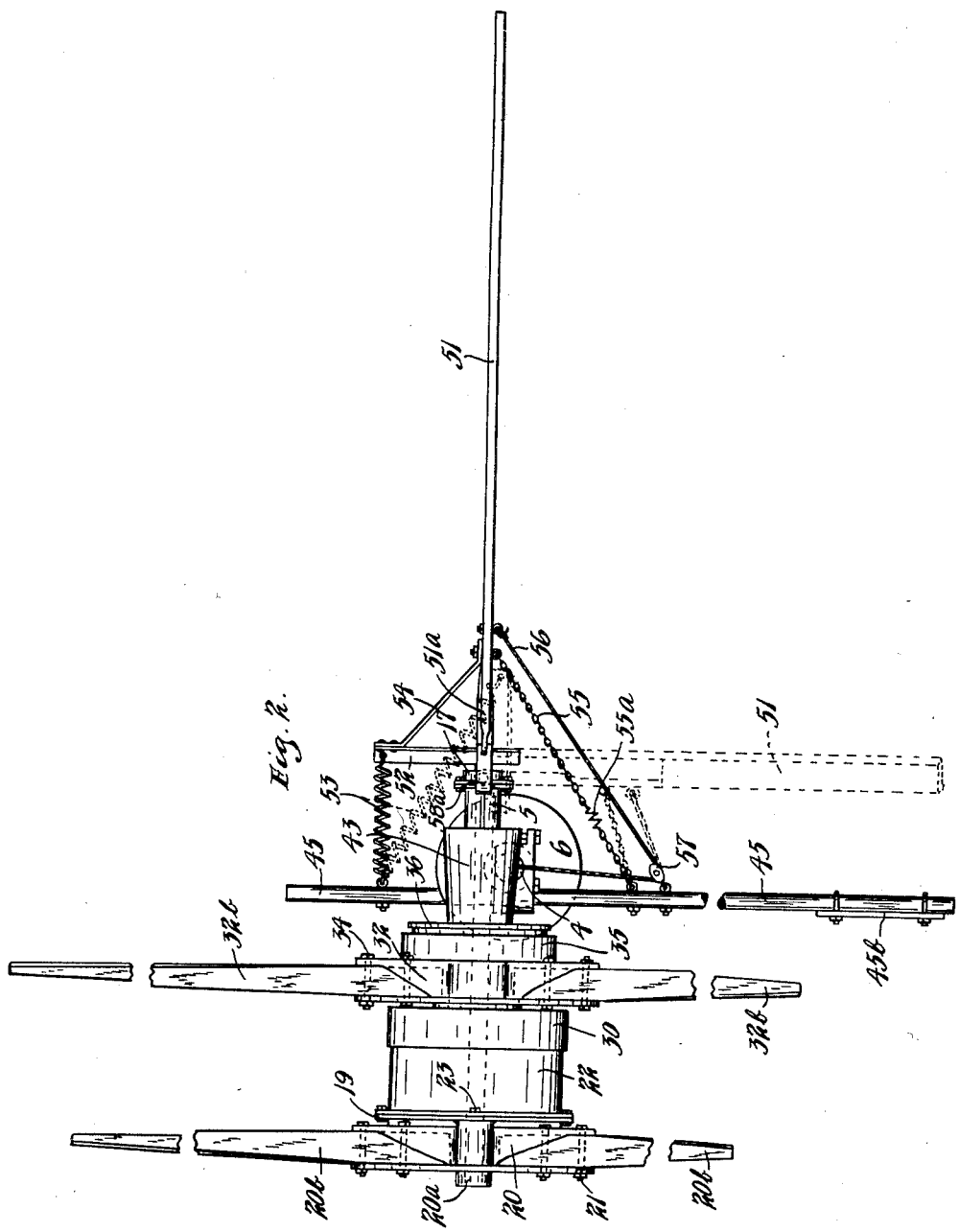
INVENTORS.
GEORGE FENEIS.
WALLACE MANIKOWSKE.
GEORGE MANIKOWSKE.
BY THEIR ATTORNEYS.

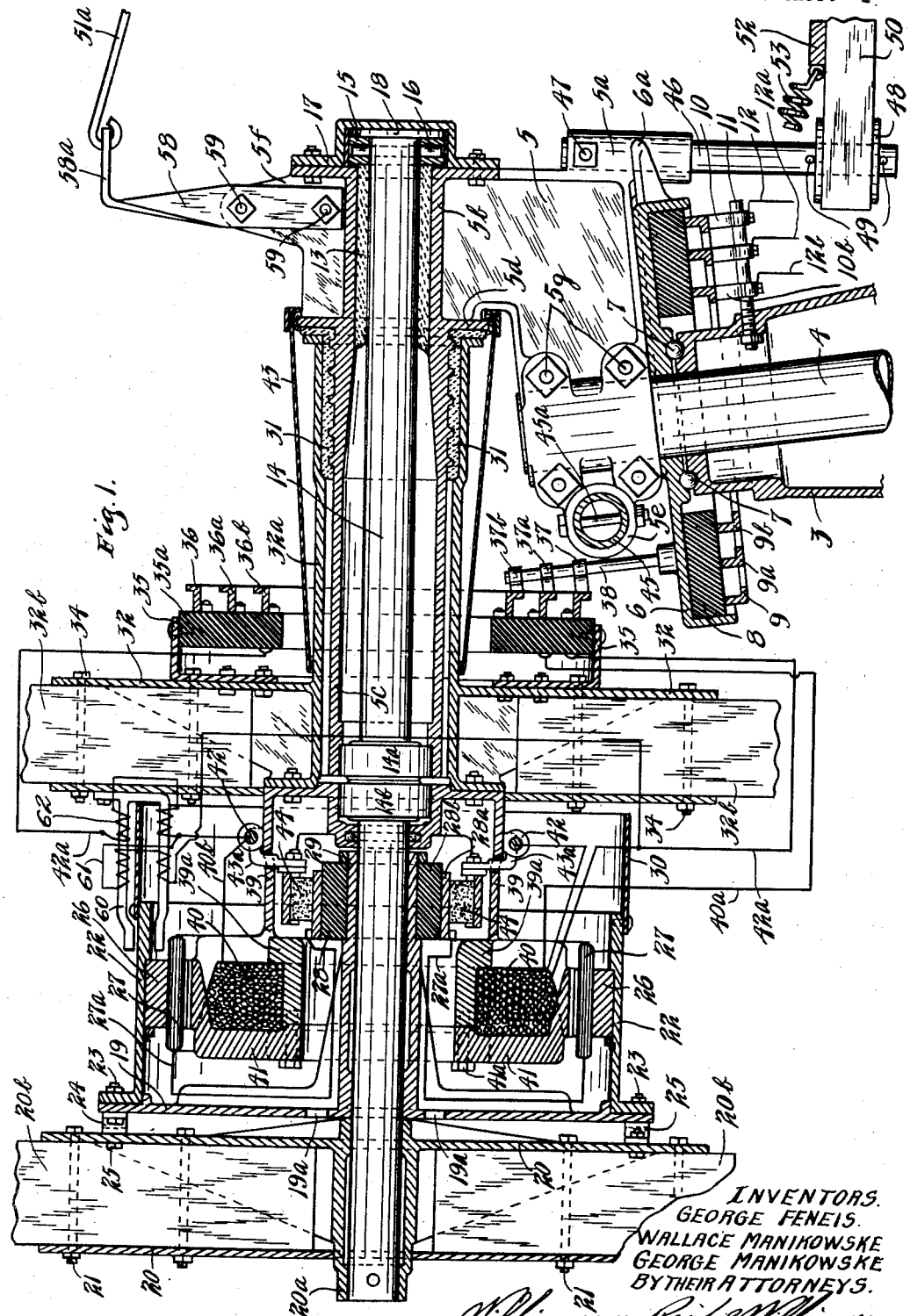

Patented Jan. 17, 1933

1,894,357

UNITED STATES PATENT OFFICE

GEORGE MANIKOWSKE, OF MINNEAPOLIS, MINNESOTA, AND GEORGE FENEIS AND WALLACE MANIKOWSKE, OF MOORETON, NORTH DAKOTA, ASSIGNORS, BY DIRECT AND MESNE ASSIGNMENTS, TO ETHEL PURDON MANIKOWSKE, OF MINNEAPOLIS, MINNESOTA

WIND ELECTRIC PLANT

Application filed October 21, 1925, Serial No. 64,062. Renewed October 9, 1931.

This invention relates to a wind electric plant. Such plants are used comprising air propellers adapted to be operated by the wind which have combined therewith the revoluble parts of an electric generator. Such plants are now commonly used to supply current for small establishments, such as farms, resorts, garages, etc., and to charge storage batteries for such establishments.

It is an object of this invention to provide a very simple and efficient wind electric plant comprising a pair of oppositely rotating air driven propellers which, respectively, carry the rotating parts of an electric current generator.

It is another object of the invention to provide such an electric plant as set forth in the preceding paragraph in which the propellers are co-axial, one carried by a sleeve which rotates on a crank on which the shaft carrying the other propeller is journaled.

It is still another object of the invention to provide a wind electric plant comprising oppositely rotating air driven coaxially arranged propellers, one of which rotates a field and the other of which rotates an armature arranged concentrically with said field.

It is still another object of the invention to provide a wind electric plant, as set forth in the preceding paragraph in which the propeller rotating the field also carries brushes cooperating with a commutator rotated by the other propeller, suitable conductors and collecting rings being provided for taking off the current.

It is a further object of the invention to provide such a wind electric plant, as defined in the preceding paragraphs, which is rotatably mounted on a support and which carries controlling means adapted to swing the propellers away from the wind when a certain torque or a certain speed has been reached by the propellers.

It is a still further object of the invention to provide such a wind electric plant, as defined in the preceding paragraph in which the controlling means comprises a pair of vanes, one of which is normally disposed at right angles to the axis of the propellers, said vanes being arranged to move toward each other under certain conditions and to swing the propellers away from the wind.

These and other objects and advantages of the invention will be fully set forth in the following description made in connection with the accompanying drawings in which like reference characters refer to the same parts throughout the different views, and in which Fig. 1 is a central vertical section through the device and the top of the tower carrying the same, the outer ends of the propellers being broken away and the controlling means being, in part, broken away; and Fig. 2 is a top plan view of the device showing the controlling means, and a different position of certain parts in dotted lines.

Referring to the drawings, the upper portion of a tower column or support 3 is shown which preferably will receive a central shaft 4. The axes of support 3 and shaft 4 normally are preferably vertical. The frame member 5 is secured to the top of shaft 4 by means of headed and nutted bolts 5g passing through split portions thereof which portions clamp the shaft. The frame 5 rests upon a ring or disk 6 having a ball bearing race on its underside in which travel the balls 7 also running in a race in the top of the column 3. The ring or disk 6 surrounds the shaft 4 and has secured therein insulating material 8 on which are secured a plurality of collecting rings 9, 9a and 9b, respectively. A plurality of brushes 10, 10a and 10b cooperate, respectively, with the rings 9, 9a and 9b and are carried on the member 11 threaded into and secured by a clamping nut in the column 3 to which brushes are connected the conductors 12, 12a, and 12b, respectively. The ring 6 has a fork 6a projecting at one side which embraces a hub 5a at one lower corner of frame 5 so that frame 5 and ring 6 rotate together. The frame 5 has a bearing 5b at its upper end having suitable antifriction material 13 therein in which is journaled a shaft 14. This shaft is held from endwise movement in one direction by a collar 15 secured thereto by a pin 16, said collar and pin being enclosed by a cap member 17 secured tightly to the end of frame 5 whereby an oiling chamber may be formed in the cap 17. Said cap may be lined on its cylindrical wall with suitable antifriction material 18 forming a bearing for the collar 15. The bearing 5b projects at the side opposite cap 17 to form a long tube 5c, said tube being bored in its outer end to receive the outer shell of a ball bearing, the inner shell or casing of which is carried by shaft 14. The shaft 14, at its outer end, has secured thereto the central hub of a member 19 and outward of the member 19 the shaft has secured thereto a central hub 20a of a propeller frame 20. The blades 20b of the propeller are secured in the frame 20 by the headed and nutted bolts 21. The blades 20b will be of thin helical form such as commonly used on air-driven propellers. The frame 19 has a drum 22 bolted thereto by the headed and nutted bolts 23 passing through a cylindrical flange at one end of said drum and said bolts also preferably pass through flexible straps 24 which are also bolted to member 19 and are attached at their other ends by headed and nutted bolts 25 to the propeller frame 20. The drum 22 has secured in its inner side an armature or frame 26 in which are wound the armature or armature coils 27. The hub of member 19 at its inner end carries a commutator 28 comprising the usual bars 28a separated by the insulation members 28b, this commutator being fitted on a reduced portion of the hub of member 19 against the shoulder formed by said reduced portion and being held thereon by a collar 29 threaded on the end of said hub. An enclosing shell 30 is secured to the open end of drum 22 and encloses the commutator and adjacent parts.

The tube 5c carries at one end a member 31 of suitable antifriction material and the hub or sleeve 32a of a propeller frame 32 is journaled at one end on said member 31. The sleeve 32a has an annular collar at one end which abuts against a flange formed on the member 31, thus forming a thrust bearing and the flange on member 31 abuts against a flange 5d formed about the bearing 5b. The propeller frame 32 has secured therein the ends of the propeller blades 32b which are fastened by the headed and nutted bolts 34. The propeller blades 32a will be of the ordinary helical type used for air driven propellers but will be disposed so as to be rotated in the opposite direction to the blades 20b. The propeller frame 32 has secured thereto at the side adjacent bearing 5b, by suitable headed and nutted bolts, a flanged ring 35 having a ring of insulating material 35a secured therein on which are mounted collector rings 36, 36a and 36b. Brushes 37, 37a and 37b engage, respectively, the rings 36, 36a and 36b, said brushes being carried by the member 38 secured to a hub projecting from the ring 6 through which pass suitable conductors connecting the brushes 37, 37a and 37b to the rings 9, 9a and 9b, respectively. The end of sleeve 32a opposite bearing 5b has a circumferential flange projecting therefrom to which is secured by suitable circumferentially spaced headed and nutted bolts, a shell 39. This shell has a frame portion 39a at its outer end which carries the field coils 40, said frame being of rather heavy cross section and having a heavy pole piece 41 secured thereto by the circumferentially spaced screws 41a. It will be noted that the outer periphery of piece 41 is concentric with the armature members 26 and 27 and rotates in close proximity thereto. The shell 39 also has mounted thereon a rotatable brush holding frame having lugs 42 in which are secured the brush holders 43a carrying the brushes 44 which are concentric with and in engagement with the armature 28. The shell 39 has a hub bored to receive the outer shell 14b of a ball bearing, the inner shell of which is carried by shaft 14. There will, of course, be suitable balls or other anti-friction members between the rings 14a and 14b and the inner rings carried by shaft 14. A casing 43 is secured at one of its ends to the flange 5d and extends over the sleeve 32a.

The brush holders 43a will be connected by suitable conductors 42a to the rings 36 and 36b, respectively. The ring 36a is connected by a suitable conductor 40a to one end of the field windings 40. The other end of said field windings are connected by a suitable conductor 40b to one of the brush holders 43a. The armature winding 27 is connected by suitable conductors 27a to the commutator 28. While the generator may be of any desired type, with the connections and parts shown, it is of a direct current type being compound wound.

The propeller frame 32 has secured at its rear side one or more U-shaped members 60 forming the pole pieces for an electro-magnet. These pole pieces, as shown in Fig. 1, are disposed at each side of the shell 30 and drum 22. Each of said pole pieces is provided with a shunt winding 61 leading from the conductors 42a and each of said pole pieces is also provided with a series winding 62 formed by the conductors 42a, the series winding being disposed on said pole pieces so as to counteract the magnetic effect produced by the shunt windings 61.

The frame 5 has a cylindrical hollow lug 5e at one side in which is secured an arm 45 shown as held by the headed and nutted bolts 45a passing through lug 5e and which is shown as a pipe or tube. This arm 45 projects at either side of the shaft 4 and it will be seen that it is a short distance at one side of said shaft. Said arm 45 is disposed substantially at right angles to the axis of shaft 14 and carries at one end a vane 45b which is disposed beyond the outer ends of the propeller blades 20b and 32b and in a plane substantially normal to the axis of the propellers formed by said blades. The hub 5a on frame 5 has secured therein a short shaft 46 shown as held by a headed and nutted bolt 47 passing therethrough and through the hub 5a. A collar 48 is journaled on shaft 46 being held from movement lengthwise of said shaft by suitable members, such as the pins 49 at each side thereof. An arm 50 is secured to the collar 48 and projects outwardly therefrom away from the shaft 4 substantially in line with the axis of shaft 14. Attention is called to the fact that the axis of shaft 14 is disposed some distance to one side of the axis of shaft 4, as clearly shown in Fig. 2. The arm 50 has secured at its outer side a large vane 51. A bar 52, illustrated as an angle bar, is secured to arm 50 and projects substantially at right angles thereto having its outer end connected by the tensile coiled spring 53 to one end of arm 45. A brace 54 is also shown extending from the outer end of bar 52 to the vane 51 carried on arm 50. The vane 51 is also connected by a flexible member, such as a chain 55 to the arm 45 at some distance from the shaft 4 and at the opposite side thereof from the spring 53 a spring 55a preferably being inserted in said chain. The vane 51 also has secured thereto a flexible member, such as a cable or rope 56 which extends over a pulley in the pulley block 57 secured to arm 45 somewhat outward of the end of chain 55 and which end extends toward shaft 4 and downward therein. Said cable will be guided by suitable pulleys (not shown) and will extend down in shaft 4 and tower 3 to a point convenient for manipulation by the operator. The top of vane 51 has an arm 51a projecting therefrom having an eyelet or loop at its end loosely engaged in an aperture formed in the end 58a of a bracket 58 bolted to a web 5f in the top of frame 5 by headed and nutted bolts 59. It will be seen that the portion 58a of arm 58 is bent substantially at right angles. The aperture in portion 58a is substantially in axial alinement with the shaft 46 and it will be seen that since shaft 4 is vertical its axis is inclined to the vertical extending toward the axis of shaft 4 at its lower end.

In operation, when the plant is running, the propellers comprising blades 20b and 32b, respectively, will be driven in opposite directions by the wind. The armature 27 will thus be rotated by one propeller and the field 40 by the other propeller and in opposite directions. Electromotive force will thus be generated and the current will be taken off of commutator 28 by the brushes 44 and delivered to the rings 36 and 36b, respectively, from which it will be conducted to rings 9 and 9b, respectively and to the conductors 12 and 12b, respectively. A regulator will be ordinarily used to regulate the field current, which regulator is not shown. For this purpose the conductor 12a is connected to the field coil. The generator will be under load and a certain torque will be developed by the rotating propellers. This torque causes a corresponding thrust or pressure of the wind against the propellers creating a moment arm which tends to revolve the propellers and frame clockwise about the axis of shaft 4. This tendency to rotate about the axis of shaft 4 will be resisted by the pressure of the wind against vane 45b which creates a moment arm tending to rotate frame 5 about axis 4 in the opposite direction. When the generator is under full load the propellers will have reached a certain speed and vane 45b will then just balance the torque or force on the propellers so that the propellers will be held in the wind or with their axes parallel with the direction of the wind. If the wind increases or is strong enough to cause the propellers to run above this speed more air will pass through the propellers and the moment arm caused by pressure of the wind on vane 45b will overbalance the moment arm urging the propellers to swing clockwise about shaft 4 and vane 45b will swing and approach vane 51, the latter extending spring 53. The vanes will thus approach each other and if the wind is sufficiently strong will eventually come into parallel relation, as indicated in dotted lines in Fig. 2. When this occurs, the vanes 45b and 51 will, of course, be maintained with their planes parallel with the direction of the wind and the propellers will be swung out of the wind or with their axes at an angle to the direction of the wind. The propellers are thus effectively controlled so that they will not run above a certain speed and the load torque exerted cannot run above a certain point. The propellers will automatically be governed, according to the load. It will be seen that vane 51, when it moves from normal position, moves into a higher plane since its axis is inclined to the vertical. This vane would tend to return to normal position by gravity. The spring 53, however, is provided to insure that the parts will return to normal position upon a reduction of speed of the propellers or reduction of wind thrust against the same. It will be seen that frame 5 will move easily on column 3, owing to the same moving with ring 6 which is supported on a ball bearing. The flexible connection, including members 25 between the propeller frame and members 19, is provided so that this frame may be disconnected from the propellers under certain testing operations. The parts adjacent shaft 14 are all nicely enclosed by drum 22 and casing 30 and the generator parts will be effectively cooled by the air passing thereover, air holes 19a being provided in member 19 for this purpose. Cable 56 is provided so that the vanes can manually be brought together, thus swinging the propellers away from the wind.

Chain 55 limits the separating movement of the vanes.

The electro-magnets 60 embrace the shell 30 and are also provided to insure that the propellers will not be driven at too high a speed when the load is off of the generator or plant. When there is no load on the generator there will be practically no current flowing in the line or in conductors 42a so that practically no magnetic effect will be produced by the series windings 62 in the magnet member 60. The shunt winding 61, however, which will have a high resistance, will have a current flowing therein and will produce a strong magnetic field about the pole pieces of member 60. The shell 30 which rotates through this field will be made of some such metal as aluminum or copper and a braking effect will thus be produced on the shell and, correspondingly, on the magnet 60. This braking effect will be increased with the speed of the propellers so that they will be retarded and will be kept from running away or revolving at too high a speed. When a load is placed on the generator and current flows through the series winding 62, the magnetic effect of the magnets 60 will be practically eliminated and no braking effect will occur. The braking effect is, therefore, automatically put on the propellers when the load is off of the generator and the propellers are running idle.

The shaft 14 extends upwardly toward the propellers so that an oil reservoir may be formed in tube 5c and sleeve 32a and the oil will run toward this reservoir in shaft 14 so that oil is kept away from the generator parts.

One of the great advantages of applicant's structure is that owing to the oppositely rotating propellers a balanced structure is obtained and it is possible to secure a delicate and efficient control.

From the above description it is seen that applicant has provided a very compact, simple and efficient wind electric plant. The parts are comparatively few and simply constructed and the machine is arranged for very efficient automatic control. The device has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A wind electric plant having in combination, an air-driven propeller, an armature rotatable thereby, a shell driven by said propeller, a second air-driven propeller adapted to be rotated in a direction opposite to the first mentioned propeller, a field adjacent said armature rotated by said second propeller, a magnet driven by said second propeller having pole pieces at each side of said shell and conductors for taking off the current generated by said field and armature, each of said pole pieces having a series winding thereon of said conductors, and a shunt winding thereof from said conductors adapted to neutralize the magnetic effect of said series winding whereby when no load is on said generator a braking effect will be produced on said shell and said propeller.

2. A wind electric plant having in combination, a frame, a shaft journaled therein, a flanged disk carried by said shaft, an insulating member in said disk, spaced collector rings carried by said insulating member, a plurality of brushes carried by said frame engaging said collector rings, conductors connected to said brushes, a member extending upwardly from said disk having a plurality of brushes carried thereby, a bracket revoluble with said shaft and disk, a shaft journaled in said bracket, a hollow shaft surrounding said shaft and journaled on said bracket having a flange thereon, a second flanged disk connected to said flange, an insulating member carried by said last mentioned flanged disk, a plurality of spaced collector rings carried on said last mentioned insulating member and engaged respectively by said last mentioned brushes, means for generating electric current carried by said shafts and conductors extending from said means to said last mentioned collector rings.

3. A wind electric plant having in combination, a frame, a shaft journaled in said frame and extending substantially vertically, a bracket secured to said shaft, a shaft extending substantially at right angles to said first mentioned shaft journaled in said bracket, a propeller secured adjacent one end of said last mentioned shaft, a hollow shaft journaled on said bracket surrounding said second mentioned shaft and concentric therewith, a propeller carried by said hollow shaft, and an armature and field carried respectively by said hollow shaft and said second mentioned shaft and disposed between said propellers.

4. A wind electric plant having in combination, a frame, a substantially vertical shaft journaled therein and projecting thereabove, a bracket secured to the projecting end of said shaft having a bearing therein, a shaft journaled in said bearing extending substantially at right angles to said first mentioned shaft, a thrust bearing carried by said bearing engaged by one end of said shaft, a propeller carried by the opposite end of said shaft, an armature carried by said shaft between its ends, a hollow shaft journaled on said bracket, said bracket having a thrust bearing engaged by one end of said hollow shaft, a propeller carried by said hollow shaft, and a field carried by said hollow shaft disposed within said armature.

5. A wind electric plant having in combination, a frame rotatable about a substantially vertical axis, a substantially horizontal shaft journaled in said frame, a propeller secured to said shaft, a hollow shaft journaled in said frame and surrounding said first mentioned shaft, a propeller carried by said hollow shaft and constructed and arranged to rotate in a direction opposite to said first mentioned propeller, a frame secured to said last mentioned propeller having a cylindrical portion, a field winding on said portion, said last mentioned frame having spaced arms extending radially and then substantially horizontally over said winding, a drum carried by said first mentioned propeller and an armature secured to the interior of said drum and closely surrounding said arms.

6. A wind electric plant having in combination, a frame rotatable about a substantially vertical axis, a substantially horizontal shaft journaled in said frame, a propeller secured to said shaft, a hollow shaft surrounding said shaft and journaled in said frame, a second propeller secured to said hollow shaft, a field winding carried by one of said propellers, an armature carried by the other of said propellers said field winding and armature being disposed between said propellers, a flanged member at the rear of said second propeller, collector rings carried by said flange member, brushes carried by said frame engaging said rings respectively and conductors leading from said brushes.

7. A wind electric plant having in combination, a frame rotatable about a substantially vertical axis, a substantially horizontal shaft journaled in said frame, a propeller secured to said shaft, a hollow shaft surrounding said shaft and journaled in said frame, a second propeller secured to said hollow shaft, a field winding carried by one of said propellers, an armature carried by the other of said propellers, said field winding and armature being disposed between said propellers, a commutator carried by said first mentioned propeller, brushes carried by said second mentioned propeller engaging said commutator, collector rings carried by said second mentioned propeller, brushes carried by said frame engaging said collector rings respectively and conductors leading from said collector rings.

8. A wind electric plant having in combination, a column, a frame rotatable in said column about a substantially vertical axis, a substantially horizontal shaft journaled in said frame, a propeller secured to said shaft, a second propeller rotatable about the axis of said shaft and constructed and arranged to rotate in a direction opposite to said first mentioned propeller, a frame secured to one of said propellers, a field winding on said last mentioned frame, said last mentioned frame having spaced arms extending radially and then substantially horizontally over said winding, and an armature secured to the other of said propellers and closely surrounding said arms.

9. A wind electric plant having in combination, a column, a frame rotatable on said column about a substantially vertical axis, a substantially horizontal shaft journaled in said frame, a propeller secured to said shaft, a second propeller rotatable about the axis of said shaft and constructed and arranged to rotate in a direction opposite to said first mentioned propeller, a field winding carried by one of said propellers, an armature carried by the other of said propellers and adapted to rotate close to said field winding, said field winding and armature being disposed between said propellers, collector rings carried by one of said propellers and brushes carried by said frame engaging said rings respectively.

10. In a wind electric plant, a support or standard, an upright shaft journaled therein and projecting thereabove, a bracket secured to the projecting end of said shaft and having a bearing therein, a shaft journaled in said bearing and inclined somewhat from the horizontal, a propeller carried by the outer end of said shaft, a concentric sleeve surrounding said shaft and spaced therefrom to provide a casing for lubricant, the inclination of said shaft and sleeve from the horizontal functioning to prevent lubricant from escaping through the outer end of said sleeve, and means associated with said shaft for generating electric current.

11. A wind electric plant having in combination, a frame, a substantially vertical shaft journaled therein and projecting thereabove, a bracket secured to the projecting end of said shaft having a bearing therein, a shaft journaled in said bearing extending substantially at right angles to said first mentioned shaft, a thrust bearing carried by said bearing engaged by one end of said shaft, a propeller carried by the opposite end of said shaft, an element of an electric generator carried by said shaft between its ends, a hollow shaft journaled on said bracket, said bracket having a thrust bearing engaged by one end of said hollow shaft, a propeller carried by said hollow shaft and a second element of said electric generator carried by said hollow shaft and disposed in juxtaposition to said first mentioned element.

12. In a wind electric plant, a support or standard, a substantially vertical shaft journaled therein, a bracket secured to the upper portion of said shaft and carrying a substantially horizontal bearing, a shaft journaled in said bearing, a thrust bearing also carried by said bracket and engaged by said shaft, a propeller mounted adjacent the outer end of said shaft, and fixed thereto, an electric rotor mounted on said shaft between its ends, a hollow shaft journaled on said bracket said bracket having a thrust bearing engaged by said hollow shaft, a propeller fixed to said hollow shaft and a second electric element also fixed to said hollow shaft and disposed in juxtaposition to said rotor element fixed to said first mentioned shaft.

In testimony whereof we affix our signatures.

GEORGE MANIKOWSKE.
GEORGE FENEIS.
WALLACE MANIKOWSKE.